(12) United States Patent
Clark

(10) Patent No.: US 9,271,472 B2
(45) Date of Patent: Mar. 1, 2016

(54) SELF-PROPELLED STALL CLEANING APPARATUS

(71) Applicant: Louise Klemm Clark, Florahome, FL (US)

(72) Inventor: Louise Klemm Clark, Florahome, FL (US)

(*) Notice: Subject to any disclaimer, the term of this patent is extended or adjusted under 35 U.S.C. 154(b) by 417 days.

(21) Appl. No.: 13/733,212

(22) Filed: Jan. 3, 2013

(65) Prior Publication Data
US 2014/0182070 A1    Jul. 3, 2014

(51) Int. Cl.
*A01K 1/015* (2006.01)
*A01K 1/01* (2006.01)
*A01B 43/00* (2006.01)
*A01G 1/12* (2006.01)

(52) U.S. Cl.
CPC . *A01K 1/01* (2013.01); *A01B 43/00* (2013.01); *A01G 1/125* (2013.01); *A01K 1/015* (2013.01); *A01K 1/0146* (2013.01)

(58) Field of Classification Search
CPC ... A01K 1/015; A01K 1/0146; A01K 1/0128; A01K 1/01; A01K 31/04; A01B 43/00; A01C 3/04; A01G 1/125; A01G 1/12; B65G 47/38; B65G 47/72; B65G 47/34
USPC ............. 15/79.2, 84, 81, 83, 79.1, 3; 172/22; 198/722, 723; 209/918; 414/729, 730; 56/327.1
See application file for complete search history.

(56) References Cited

U.S. PATENT DOCUMENTS

| | | | | |
|---|---|---|---|---|
| 1,810,389 A * | 6/1931 | Boettcher | ......................... | 171/87 |
| 2,037,624 A * | 4/1936 | Franklin | ......................... | 56/330 |
| 2,621,773 A * | 12/1952 | Coggins et al. | ................ | 198/314 |
| 2,774,209 A * | 12/1956 | Bauer | ............................... | 56/122 |
| 3,115,654 A * | 12/1963 | Zimmerman | ................... | 15/49.1 |
| 3,308,613 A | 3/1967 | Davidson | | |
| 3,348,652 A | 10/1967 | Vinyard | | |
| 3,599,785 A * | 8/1971 | Stuart et al. | .................... | 198/314 |
| 3,777,327 A * | 12/1973 | Ellis | .................................. | 15/84 |
| 3,790,986 A | 2/1974 | Burger | | |
| 4,399,577 A | 8/1983 | Pyle | | |
| 4,482,019 A * | 11/1984 | Murphy | ........................... | 171/63 |
| 4,711,403 A | 12/1987 | Gregory | | |
| 4,982,559 A | 1/1991 | Calais | | |

(Continued)

FOREIGN PATENT DOCUMENTS

CN    101637131    8/2011
EP    2183965    5/2010

OTHER PUBLICATIONS

Chain Conveyors Belts for positive drive Conveying, Audubon Sales & Service,Nov. 2002, https://web.archive.org/web/20020205033650/http://www.meshbelt.com/Chainweave.html, Aug. 20, 2015.*

*Primary Examiner* — Joseph J Hail
*Assistant Examiner* — Arman Milanian
(74) *Attorney, Agent, or Firm* — David L. King

(57) ABSTRACT

A self-propelled stall cleaning apparatus has a frame assembly, one pair of drive wheels, a motor attached to the assembly for driving the drive wheels and a motor driven collector head. The collector head has a pivoting fork with tines for collecting manure and debris. The fork picks up the manure and debris and tosses it onto a sifting conveyor. The sifting conveyor separates the manure from the bedding and delivers the manure to a lift conveyor which drops the manure into a collection bin. The collection bin is moveable from a stowed position to a dumping position.

13 Claims, 6 Drawing Sheets

(56) References Cited

U.S. PATENT DOCUMENTS

| | | | | |
|---|---|---|---|---|
| 5,010,620 A * | 4/1991 | Young | | 15/347 |
| 5,121,592 A | 6/1992 | Jertson | | |
| 5,133,413 A * | 7/1992 | Baxter | | 171/63 |
| 5,477,812 A * | 12/1995 | Waters | A01K 1/0114 | 119/163 |
| 5,652,992 A * | 8/1997 | Ng | | 15/79.2 |
| 5,816,336 A * | 10/1998 | Underhill | | 172/22 |
| 5,901,911 A * | 5/1999 | Davis | | 241/30 |
| 5,927,513 A | 7/1999 | Hart | | |
| 6,092,668 A | 7/2000 | Lewis | | |
| 6,321,849 B1 * | 11/2001 | Underhill | | 172/22 |
| 6,334,538 B1 | 1/2002 | Nettles | | |
| 6,446,298 B1 | 9/2002 | Berg | | |
| 6,488,100 B2 * | 12/2002 | Underhill | | 172/22 |
| 7,156,236 B2 | 1/2007 | Geraghty | | |
| 7,591,378 B2 | 9/2009 | Mang | | |
| 2010/0095898 A1 * | 4/2010 | Cook | A01K 1/0114 | 119/166 |

\* cited by examiner

SELF-PROPELLED STALL CLEANING APPARATUS

FIELD OF THE INVENTION

This invention relates to a self-propelled stall cleaning apparatus.

BACKGROUND OF THE INVENTION

Bedding material used in animal stalls has to be periodically removed and replaced. Such bedding material can be made of wood shavings, straw or other suitable materials. Often the stalls have dirt floors, typically made of clay, soil or even concrete floors typically with rubber mats onto which the bedding is laid.

When the animal droppings accumulate, the bedding material is often rendered useless. However, properly maintained mucking of stalls has enabled the bedding material to last over more extended periods of time.

Cleaning stalls typically is a manual effort involving labor intensive use of pitch forks and wheel barrows.

When cleaning a single stall, this method is very reliable and reasonably efficient. In larger horse farms, this chore may involve cleaning many stalls often 20 or 30 or more. In these situations, the amount of manure removed can be very large and the work extremely fatiguing.

An attempt to solve this dilemma was disclosed in U.S. Pat. No. 6,334,538 entitled "Stall Cleaner" granted on Jan. 1, 2002. This apparatus was effectively a scoop shovel on wheels that a person operating could push into the bedding, sift out the manure and tilt it into a debris bag. The device improved the reuse of shavings, but was still manually operated. The apparatus, when loaded with manure, became very heavy and cumbersome and required manual unloading or dumping of the bag. This made the device somewhat impractical for large scale use. In fact it is only believed usable on a few stalls at most due to the lifting and weight penalties associated with its use.

The object of the present invention is to reduce or eliminate some if not all of these issues by providing a more user friendly motor driven apparatus requiring very little manual effort.

SUMMARY OF THE INVENTION

A self-propelled stall cleaning apparatus has a frame assembly, one pair of drive wheels, a motor attached to the assembly for driving the pair of drive wheels and a motor driven collector head. The collector head has a pivoting fork with tines for collecting manure and other debris. The fork has a pair of pivoting arms each with a movable pivot end located in a cam guide wherein the pivoting arms are driven by a rotatable cam or link arm. The cam or link arm is connected through a clutch and head control lever wherein activation of the head control lever engages the clutch and moves the fork. Preferably, as the cam or link arm rotates it guides the pivot end along a guide path that first lowers the pivot ends, moves the fork forward in a generally horizontal thrust causing the fork to engage the manure. The guide path turns vertically up causing the pivot to move upward causing the fork to rapidly rotate and pivot upwardly tossing the manure rearwardly.

The cam or link arm rotates 360 degrees causing the fork to lower, extend and move up on each return cycle to repeat the collection movement of down, forward, up and flip. The cam or link arm has a bearing connected to a shaft having a sprocket driven by a chain or belt which is engaged when the control lever is pressed causing the clutch to engage.

The self-propelled stall cleaning apparatus further has a sifting conveyor made of open wire mesh. The sifting conveyor receives the tossed manure and debris and sifts bedding material as it moves rearwardly to drop the manure and debris. A plurality of rods threaded transversely extends passing through openings in the mesh with the rod ends fixed into openings of roller chains on each side of said mesh. Each of the roller chains is placed on a forward sprocket and extends to a rear sprocket. One of the forward or rear set of sprockets is driven by the motor when the control lever is depressed engaging the clutch. The front sprockets preferably are idlers and the rear sprockets are driven.

The self-propelled stall cleaning apparatus further has a manure debris material lift conveyor. The lift conveyor receives the manure debris material rearwardly dropped from the mesh conveyor and lifts the material on an incline upwardly where it is dumped. The lift conveyor is made of chain and has periodically spaced slats extending across the width of the chain for carrying the material along the chain. The lift conveyor is connected to a forward lower sprocket pair and a rearward elevated sprocket pair, with a solid deck (platform) in between, wherein the lift conveyor chain and slats rotate about the platform to drop the elevated material at a rearward elevated location.

The self-propelled stall cleaning apparatus further has a collection bin positioned at the rearward elevated location below the lift conveyor. The collection bin has sides, two of the sides each have a curved guide track affixed. The collection bin is attached to the frame by at least one roller affixed to each side of the frame. The roller is in the guide tracks and the bin is movable from a low stowed position upwardly along the guide tracks to a tilted debris dumping position. Preferably, the bin is attached or rests on a movable platform. The self-propelled stall cleaning apparatus further has a means for lifting the bin. The means for lifting the bins is one of either hydraulic or pneumatic cylinders or a motor driven screw jack for moving the bin along the curved guide tracks. The self-propelled stall cleaning apparatus preferably has a second pair of forward wheels making the apparatus a four wheeled vehicle, one pair of wheels being motor driven. The self-propelled stall cleaning apparatus also has a pair of handles extending rearwardly from the frame. The handles extend on each side of the collecting bin and past the bin. The handles allow the operator to steer the device and activate the control levers. The handles have a throttle lever, a propulsion lever for driving the wheels and a clutch lever for engaging the collector head and conveyors. The apparatus also may have a bin lift lever or switch for dumping the filled bin.

BRIEF DESCRIPTION OF THE DRAWINGS

The invention will be described by way of example and with reference to the accompanying drawings in which:

FIG. 3A being the start and FIG. 3E being the end at a debris tossing position, the cam or link arm being vertical and starting to move back to the horizontal re-start position of FIG. 3A.

FIG. 6A being the stowed loading position. FIG. 6B being a lifted intermediate position and FIG. 6C being the downwardly tilted dumping position.

DETAILED DESCRIPTION OF THE INVENTION

Figure 1:
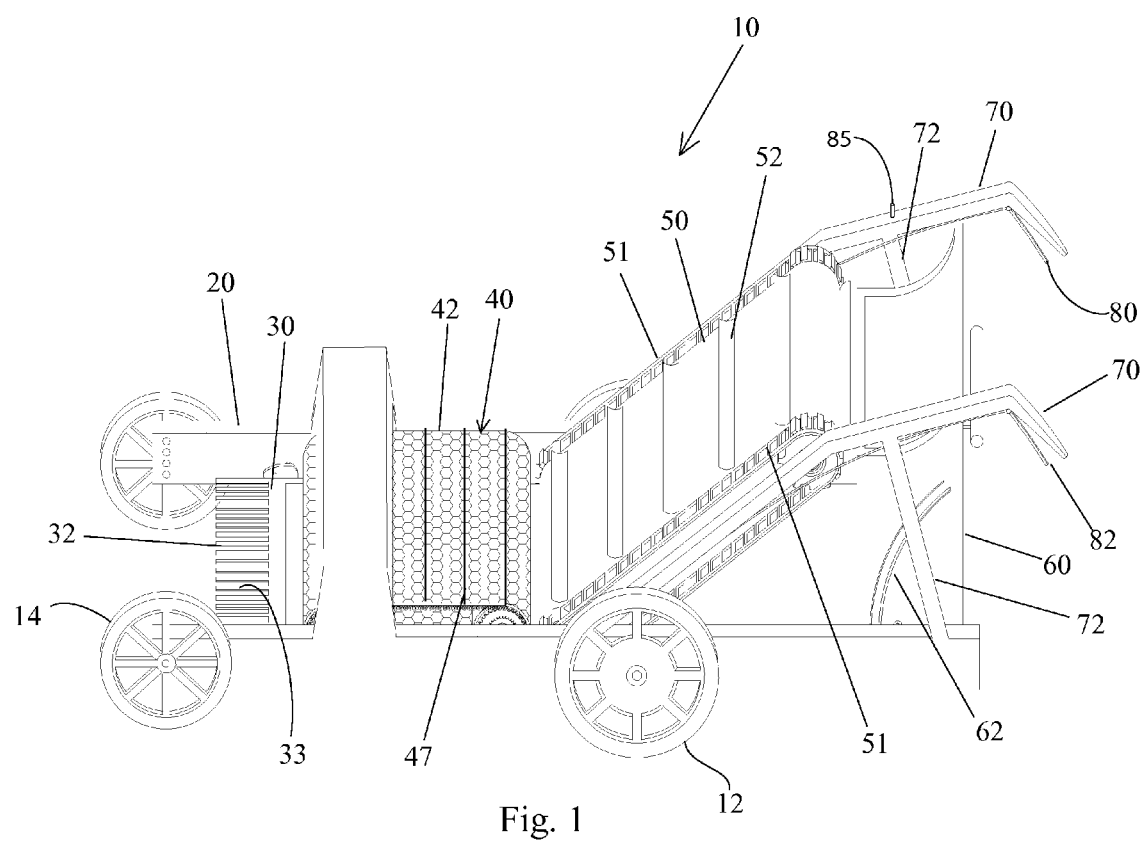
FIG. 1 is a perspective view of the self-propelled stall cleaning apparatus of the present invention.

With reference to FIG. 1, a perspective view of the present invention is shown. As illustrated, a stall cleaning apparatus 10 is shown. In the preferred embodiment, the stall cleaning apparatus 10 has a frame assembly 20 to which various mechanisms are attached. As shown in FIG. 1, the apparatus 10 has four wheels, two rear wheels 12 are driven by a motor 100, the forward wheels 14 are provided for stability and steering support. It is possible to design the apparatus with only two large drive wheels 12. If so constructed, the drive wheels 12 are positioned in such an orientation that they would move slightly forward to provide a center of gravity support for the entire apparatus 10. It is believed preferable however, that the device be made with four wheels as illustrated. With reference to the forward end of the apparatus 10 is shown a motor driven collector head 30. The collector head 30 has a pivoting fork 32 as shown. This fork 32 has tines 33 for collecting manure and other debris. On each side of the fork 32 is a pair of pivoting arms 34, each having a pivot end 36 located in a cam guide path 21 as illustrated more clearly in FIGS. 3A-3E. In addition, the apparatus 10 has a sifting conveyor 40 just rearward of the collector head 30. The sifting conveyor 40 as shown is made of an open wire mesh 42 that receives the tossed manure and debris material 2 and sifts the bedding materials and moves rearwardly to move the manure and debris material 2. Just rearward of the sifting conveyor 40 is shown a material lift conveyor 50. The lift conveyor 50 has a plurality of slats 52 extending transversely across and in between a pair of flat link chains 51. This lift conveyor 50 lifts the manure 4 and drops it at a collection bin 60 shown at the rearward most end of the apparatus 10. Extending along each side of the lift conveyor 50 is a pair of handles 70. These handles 70 provides a means for the operator to control the apparatus 10 and to operate a lever 80 which will engage the motor 100 to drive the apparatus 10 forward and also a lever 82 to operate the collector head 30 and conveyors 40, 50 so that the apparatus 10 can collect the manure 4. The collection bin 60 as shown, has a guide track 62 which enables it to be tilted along the curved guide track 62 and dumped when the bin 60 is full or as needed. These and other features of the apparatus 10 will be discussed in more detail with respect to the accompanying figures and drawings.

Figure 2:
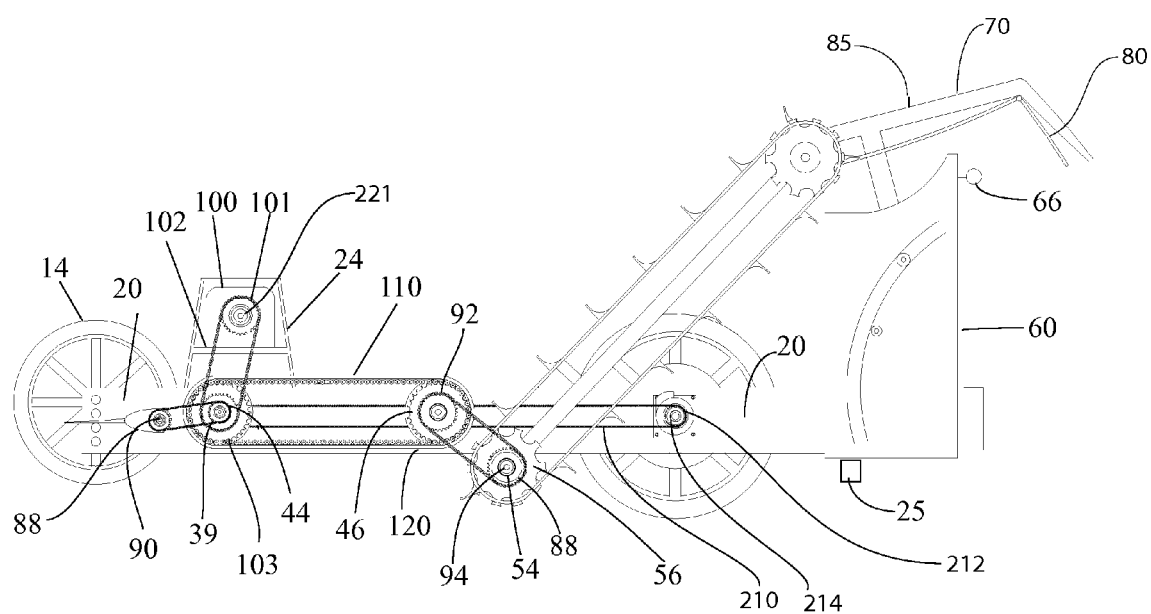
FIG. 2 is a side plan view of the apparatus of FIG. 1 with one side of the frame removed for clarity.

With reference to FIG. 2, a portion of the frame 20 is removed so that the drive mechanism which consists of a plurality of chains connected to the various conveyors 40, 50 and motor 10 can be easily observed. As shown, the motor sits above the assembly in a housing portion 24 of the frame 20. The motor 100 has a chain 102 and sprocket 101 assembly that is directed downward to a sprocket 103 attached to an axle 90 to which the forward end sprocket 44 of the sifting conveyor 40 and also is fixed and a collector head sprocket 39 is connected to the collector head 30. A sifting conveyor 40 extends from the forward sprocket back 44 to a rear sprocket 46 on an axle 92 and has the sifting conveyor 40 engaged about both sprockets 44, 46 in a continuous loop so that it can rotate about the sprockets 44, 46 when driven such that the material is received at a forward end of the sifting conveyor 40 and moved to a rearward end as it is being moved the material is being sifted. A plurality of rods 47 shown in FIG. 1 being threaded transversely extends passing through openings in the mesh 42 with the rod ends fixed into openings of roller chains 110 on each side of said mesh 42. Each of the roller chains 110 is placed on a forward sprocket 44 and extends to a rear sprocket 46. The forward sprocket 44 is driven by the motor 100 when the control lever 82 is depressed engaging a clutch 221. The front sprockets preferably are idlers and the rear sprockets are driven. Additionally, a small conveyor lifting sprocket 54 at the rearward end is shown attached to axle 92 along with the larger rear sprocket 46. These sprockets 46, 54 are attached to small shafts or axles inside bearings and bushings 88. Extending from the rearward lifting sprocket 54 to a sprocket 56 on the material lift conveyor 50 is a chain 120 which drives the material lift conveyor 50 in such a fashion that it drives the lift conveyor 50 such that the manure can be lifted upwardly into the elevated end of the lift conveyor 50 and the material dumped into the bin 60 as illustrated in FIG. 2.

Figure 3:
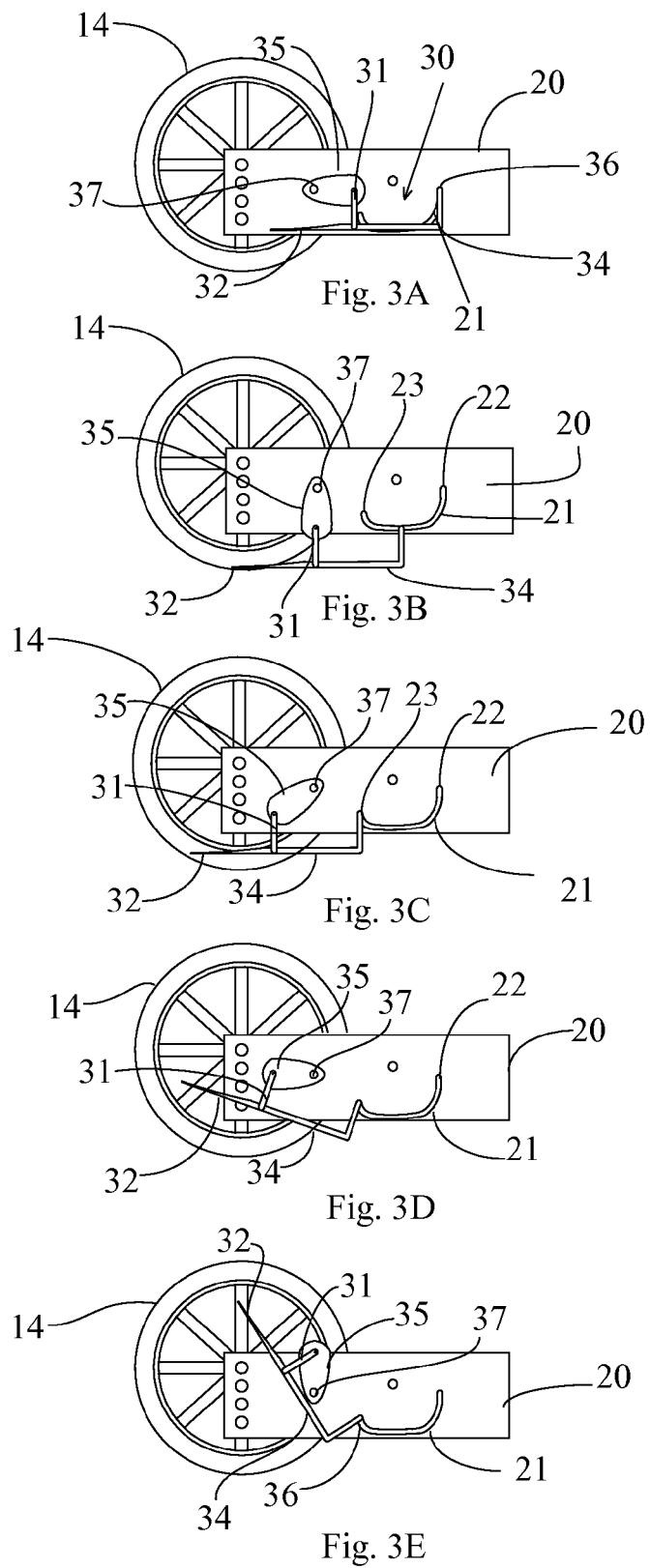
FIGS. 3A-3E are side partial views showing the collection fork movement sequentially on a debris collection stroke showing the movement of the pivot end in the guide path.

With reference to FIGS. 3A-3E, an important aspect of the invention is how the collector head 30 functions with regard to collecting the manure 2. As shown in FIG. 3A, the collector fork 32 is shown in a horizontal position. An arm 31 is shown connected to the cam or link arm 35 about midway up the collection fork 32. At an end of the collection fork 32 is a pivot end 36. The pivot end 36 follows in a guide path 21 attached to the frame 20 as illustrated. When a lever 82 is activated on the handle 70 at the rear end of the apparatus 10, a clutch engages and the collector head 30 will start to move from the stowed position in FIG. 3A to a lowered position shown in FIG. 3B, as the cam or link arm 35 rotates clockwise about a pivot pin 37, the collection fork 32 is moved forwardly into the manure pile (not shown). The lowered fork tines 33 engage the debris and as the cam or link arm 35 continues to rotate upward, as shown in FIG. 3D, the pivot end 36 reaches a forward terminal end 23 of the guide path 21. When this occurs, continued movement of the cam or link arm 35 causes the fork 32 to flip upwardly as shown in FIG. 3E. This can occur in a very high speed movement as fast as approximately 2 rotations or cycles can occur every second. The rotation of the fork 32 is very rapid, approximately 120 cycles per minute. The speed of the mechanism can be varied by the throttle control 85 to vary the speeds higher or lower. The apparatus 10 can be designed to have various sized sprockets to further change the speeds. As further illustrated, once the position shown in FIG. 3E is achieved, the motion of the fork 32 is moved back to the starting position shown in FIG. 3A, thus lowering the fork 32 and moving it back to the upward stowed position. Thereafter the sequence is repeated through FIGS. 3B, 3C and 3D whereupon more manure can be acquired. To assist in the collector head 30, a second lever 80 is provided that enables the operator to engage the drive wheels 12 of the apparatus 10 into a forward driving motion. When doing this, the wheels 12 can be moved forward deeper into the manure pile as the apparatus 10 is cleaning the stall. All of this action is occurring based on the motor 100 driving the apparatus 10 and virtually no manual labor is required other than fundamental steering and actuation of the levers 80 or 82 at the handles 70.

Figure 4:
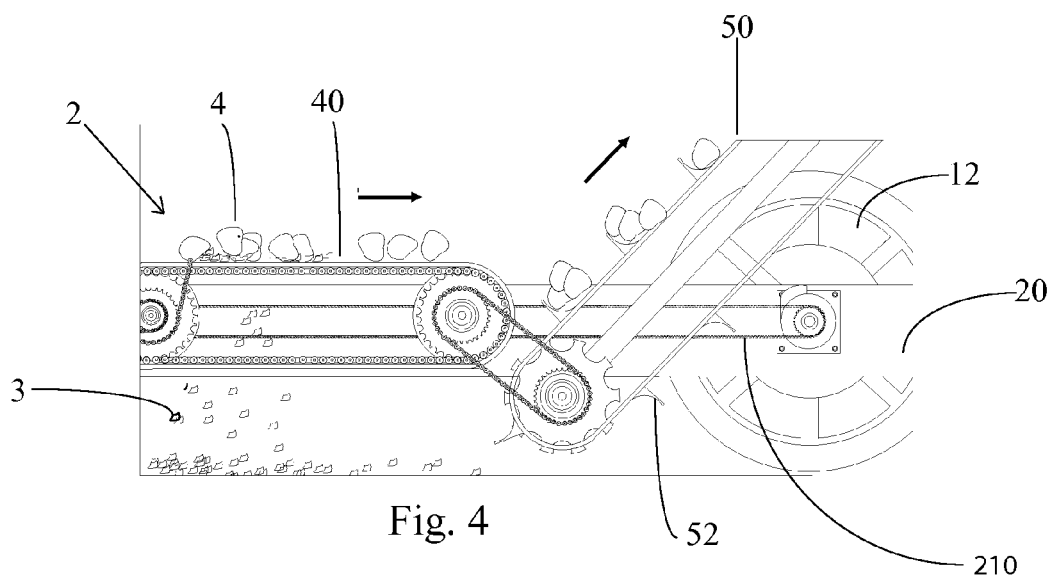
FIG. 4 is a side plan view showing how the stall material is sifted on the sifting conveyor and dropped on the elevated conveyor.
Figure 5:
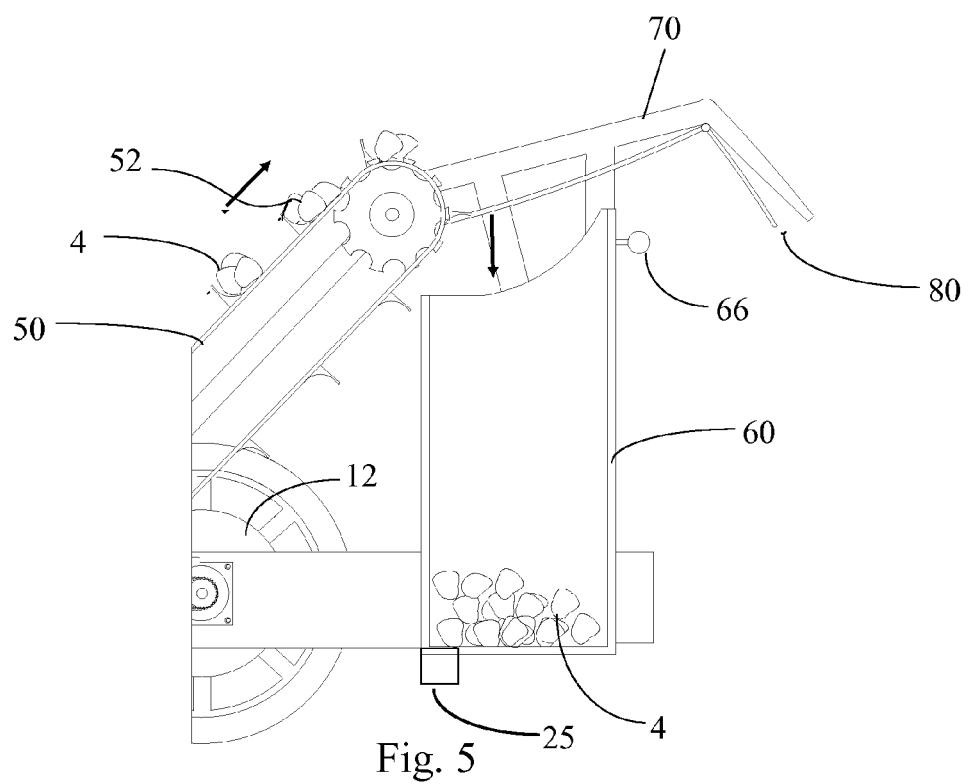
FIG. 5 is a side plan view showing how the manure is lifted and dropped from the elevated conveyor into the collection bin.

With reference to FIG. 4, once the material 2 is collected and tossed, large manure 4 is conveyed on a sifting conveyor 40 as previously mentioned. As the sifting conveyor 40 continues to rotate, small particles 3 of sawdust, dirt, or bedding material can drop through the open mesh 42 of the sifting conveyor 40 as it is moved rapidly towards the rear end of the apparatus 10. Once the manure 4 reaches the end of the sifting conveyor 40, it is dropped onto the elevated lift conveyor 50 where the lift conveyor 50 has a plurality of slats 52 extending across the conveyor 50 to catch the manure 4 and carry it upwardly as shown in FIG. 5 towards the handles 70 and the bin 60. The bin 60 is shown in a stowed position resting on a platform or bar 25 affixed to the frame 20, at this point the manure 4 is being collected into the collection bin 60.

Figure 6A:
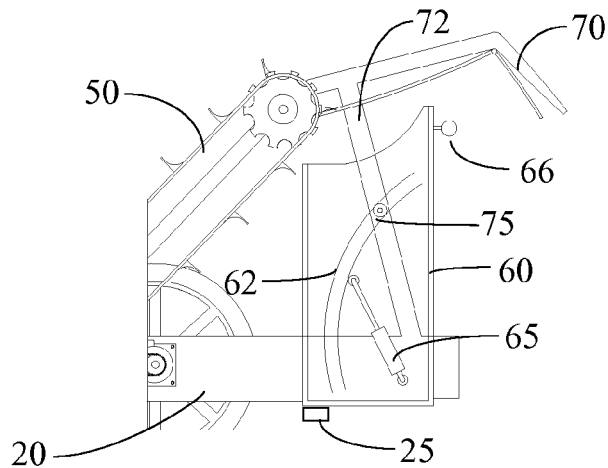
FIGS. 6A-6C show how the collection bin can be unloaded using the curved guide track and the lifting means.
Figure 6B:
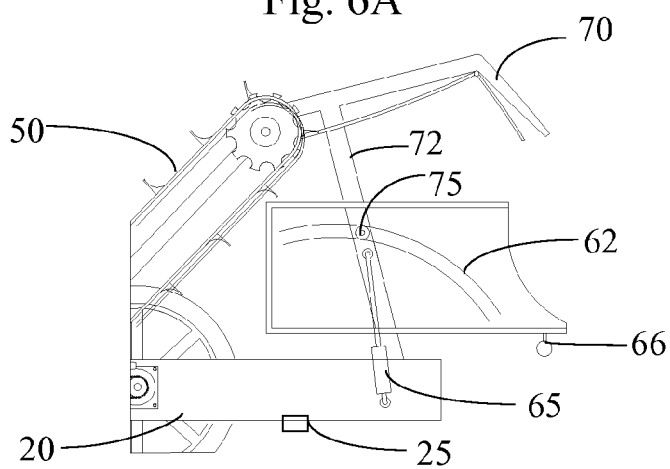
Figure 6C:
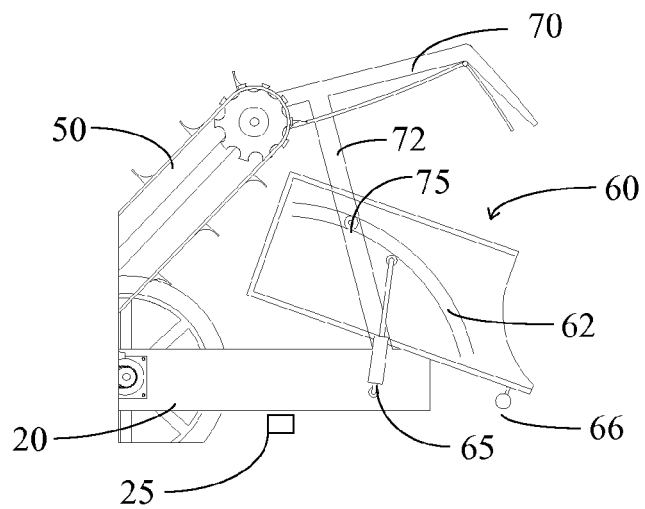

With reference to FIG. 6, the operation of the collection bin 60 is shown. The collection bin 60 sits on a platform or frame 25 that traverses across the frame 20. This platform or frame 25 enables the bin 60 to sit in an upright, vertical position. Along the side shown in dashed lines are two curved tracks 62 and a pneumatic cylinder 65. This pneumatic cylinder 65 provides a lift mechanism to lift the bin, tilt it, and dump the manure 4. This operation is shown in FIGS. 6A-6C. Once emptied, the cylinders are reversed (retracted) causing the bin to return to the stowed position shown in FIG. 6A. While the pneumatic cylinders 65 as shown connected to the bin 60 enable the bin 60 traverse along the track 62, it is also understood that these pneumatic cylinders could be replaced by hydraulic cylinders or compressed springs or other like mechanisms to assist in the lifting of the bin 60. Alternatively, motor driven screw jacks can be used, if so desired to provide an upward lift and assist in the movement of the bin 60. It is believed important that the bin 60 be of large enough capacity that it can handle one or more stalls and therefore can hold a large volume of manure 4. The capacity of the bin 60 is sized to hold approximately 80 to 100 pounds of manure 4. As such the apparatus 10 itself can get quite heavy as the stalls are being cleaned. It is therefore important that the bin 60 be easily offloaded. As shown, the bin 60 provides a simple and convenient way for the operator to grasp the handle 66 to tilt the bin 60 with virtually no lifting required. This enables a person to be able to clean a stall rapidly with very little fatigue because the machine is operated with motor driven wheels 12 it is possible to have the apparatus 10 propelled in a forward direction or rearward direction if so desired dependent on the clutch and transmission system chosen for the apparatus 10. It is understood that the apparatus 10 uses self-propelled wheels 12 to support movement of the apparatus 10 in the stalls. It is further important that the width of the entire apparatus 10 be sufficiently narrow that it enables the entire apparatus 10 to operate between small stall doors. Preferred embodiment utilizes an 18" collection head, and apparatus is 36" wide or less. Overall length of apparatus is 60" or less. This is important in that the apparatus 10 must enter into a stall and be maneuverable so that the operator can go into a stall turn the apparatus 10 and leave the stall if so desired. It is preferable the apparatus 10 provide both forward and rearward motion in the most ideal situations. However, if the apparatus 10 only has forward propulsion this quite acceptable as long as the apparatus can be pulled backward manually if so desired. Maneuvering of the apparatus 10 is facilitated by the use of the large rearward wheels 12 which are preferably the drive wheels 12. The forward wheels 14 are optional, but highly recommended as previously discussed. They provide additional stability and control and enable the operator to maneuver the apparatus 10 without any need of balancing the apparatus 10. If however, the apparatus 10 were made as a two wheel component, the operator would have to balance the entire apparatus 10. This is somewhat difficult in that the bin 60 as it loads will make the apparatus somewhat rearward heavy and will cause the operator to balance more additional weight. Therefore, it is believed most preferable the apparatus 10 be provided as a four wheeled apparatus. These and other alternative constructions are possible.

Figure 7A:
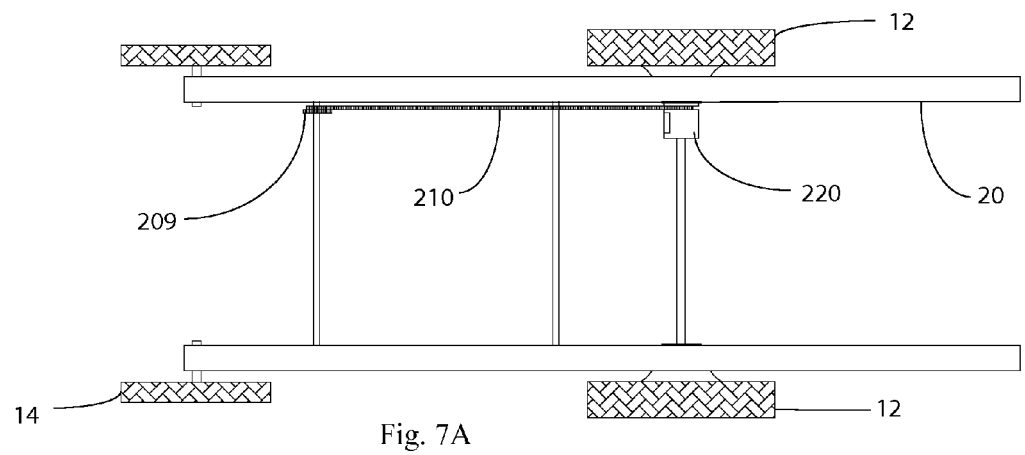
FIG. 7A is a top plan view with the motor and housing removed to better show the drive chain or belt for driving the rear wheels of the apparatus.
Figure 7B:
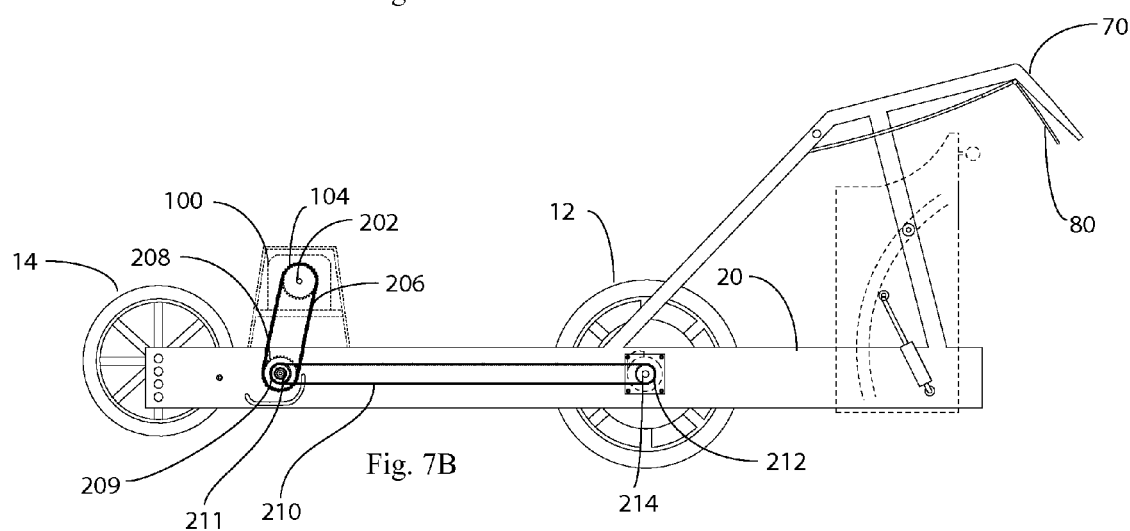
FIG. 7B is a side view of the apparatus showing drive apparatus connected to the motor drive shaft in phantom. It being understood the view is looking through motor and housing to see the drive chains.
Figure 7C:
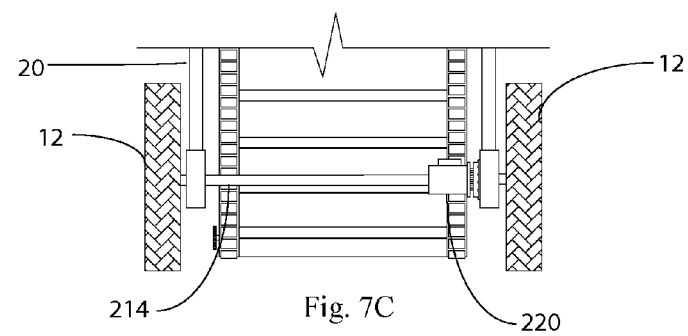
FIG. 7C is a view showing a clutch assembly mounted on the drive axle of the apparatus.

With reference to FIG. 7, the drive mechanism for the wheel 12 is shown wherein the wheel 12 is engaged to the motor 100 through a transmission belt and/or chain 140 which drives and propels the rear wheels 12, as illustrated. With reference to FIG. 1, the motor 100 is attached in the frame 20 of the apparatus 10 suspended above the sifting conveyor 40. As shown the motor 100 used is a gas powered motor, preferably a 4-cycle engine commonly used on lawn mowers, however with a horizontal drive shaft. This enables several mechanisms to be operated off of the shaft somewhat independently with the use of clutch mechanisms for both the propulsion of the drive wheels and the operation of the collector head and conveyor assemblies. The horse power needed to drive the device is considered to be within the range commonly used for small lawn mowers in the 4 to 6 hp range. Larger or smaller engines are contemplated depending on the construction material used for the frame.

As shown the frame 20 is preferably made of low cost steel. The frame 20 further has a bracing support 72 that extends from the handle 70 back to the rearward portion of the frame 20 to provide structural integrity of the entire apparatus 10 particularly at the handle 70 regions. This bracing support 72 includes a roller mechanism 75 positioned inside the guide track 62. This roller mechanism 75 is rotatable in a fixed position on the brace 72 such that the bin 60 can roll across the roller 75 on the side bracing 72 for the dumping of the manure 4 as previously discussed.

With reference to FIGS. 7A and 7B, the motor 100 has a portion of the drive shaft 202 connected to a drive sprocket 104 or pulley. As shown, the drawing uses toothed sprockets and chains, however, the drive assembly could alternatively use a belt and pulley drive as an equivalent means of propelling the rear wheels 12. The drive assembly has a motor chain 206 connected to a lower large sprocket 208 and a smaller sprocket 209 both fixed to a rotatable shaft 211. A wheel chain 210 is driven by the smaller sprocket 209 which is connected to the sprocket 112 on rear wheel axle 214. Engagement of the lever 80 on the handle engages a clutch assembly 220 to drive chains connected to the motor 100 for forward propulsion of the apparatus 10.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A self-propelled stall cleaning apparatus comprises:
   a frame assembly;
   a pair of handles extending rearwardly from the frame for steering the apparatus;
   one pair of drive wheels;

a motor attached to the assembly for driving the pair of drive wheels;

a motor driven collector head, the collector head having a pivoting fork with tines for collecting manure and other debris, the fork having a pair of pivoting arms each with a movable pivot end slidably located in a "U" shaped cam guide wherein the pivoting arms are driven by a rotatable cam or link arm, the cam or link arm being connected through a clutch and head control lever wherein activation of the head control lever engages the clutch and moves the fork, wherein as the cam or link arm rotates it guides the pivot end along the "U" shaped guide path that first lowers the pivot ends, moves the fork forward in a generally horizontal thrust causing the fork to engage the manure, the "U" shaped guide path turns vertically up causing the pivot to move upward causing the fork to rapidly rotate and pivot upwardly tossing the manure rearwardly and wherein the apparatus has an overall width and an overall length to be maneuverable into and turnable within a stall for cleaning and removal of manure and other debris;

a sifting conveyor made of open wire mesh, the sifting conveyor receives the tossed manure and debris and sifts bedding material as it moves rearwardly to drop the manure and debris;

a manure debris material lift conveyor, the lift conveyor receives the manure debris material rearwardly dropped from the mesh conveyor and lifts the material on an incline upwardly where it is dumped; and a collection bin positioned at the rearward elevated location below the lift conveyor and wherein the collection bin is affixed to one or more curved guide tracks, the collection bin being movable from a low stowed position for receiving manure and other debris to an upward position along the guide tracks to a tilted debris dumping position by an operator activated lift mechanism.

2. The self-propelled stall cleaning apparatus of claim 1 wherein the cam or link arm rotates 360 degrees causing the fork to lower retract and move up on each return cycle to repeat the movement of down forward up and flip.

3. The self-propelled stall cleaning apparatus of claim 1 wherein the cam or link arm has a bearing connected to a shaft having a sprocket driven by a chain or belt which is engaged when the control lever is pressed causing the clutch to engage.

4. The self-propelled stall cleaning apparatus of claim 1 further comprises a plurality of rods threaded transversely extending passing through openings in the mesh with ends fixed into openings of roller chains on each side of said mesh, each of the roller chains being placed on a forward sprocket and extending to a rear sprocket driven by the motor when the control lever is depressed engaging the clutch.

5. The self-propelled stall cleaning apparatus of claim 4 wherein the front sprockets are idlers and the rear sprockets are driven.

6. The self-propelled stall cleaning apparatus of claim 1 wherein the lift conveyor is made of chain and has periodically spaced slats extending across the width of the chain for carrying the material along the chain.

7. The self-propelled stall cleaning apparatus of claim 6 wherein the lift conveyor has a platform connected to a forward lower sprocket pair and a rearward elevated sprocket pair wherein the lift conveyor chain and slats rotate about the platform to drop the elevated material at a rearward elevated location.

8. The self-propelled stall cleaning apparatus of claim 1 wherein the collection bin is attached to the frame by at least one roller affixed to the frame, the rollers being in guide tracks and the bin is movable from a low stowed position upwardly along the guide tracks to a tilted debris dumping position.

9. The self-propelled stall cleaning apparatus of claim 8 wherein the bin is attached or rests on a movable platform.

10. The self-propelled stall cleaning apparatus of claim 9 wherein the apparatus further comprises a means for lifting the bin, the means for lifting the bins being one of either hydraulic or pneumatic cylinders or a screw jack for moving the bin along the curved guide tracks.

11. The self-propelled stall cleaning apparatus of claim 1 has a second pair of forward wheels making the apparatus a four wheeled vehicle, one pair of wheels being motor driven.

12. The self-propelled stall cleaning apparatus of claim 1 wherein the handles have a throttle lever, a propulsion lever for driving the wheels and a clutch lever for engaging the collector head and conveyors.

13. The self-propelled stall cleaning apparatus of claim 12 wherein the apparatus has a bin lift lever or switch for activating the lift mechanism for dumping the filled bin.

\* \* \* \* \*